US006863006B2

(12) United States Patent
Sandoval et al.

(10) Patent No.: US 6,863,006 B2
(45) Date of Patent: Mar. 8, 2005

(54) DRIVE MECHANISM FOR AGRICULTURAL PLANTERS

(75) Inventors: Jaime Arana Sandoval, Queretaro (MX); Francisco Perez Cervantes, Queretaro (MX); Ivan Gabriel Salcedo Mendoza, Queretaro (MX)

(73) Assignee: CNH America LLC, Racine, WI (US)

( * ) Notice: Subject to any disclaimer, the term of this patent is extended or adjusted under 35 U.S.C. 154(b) by 34 days.

(21) Appl. No.: 10/409,011

(22) Filed: Apr. 8, 2003

(65) Prior Publication Data

US 2004/0206282 A1 Oct. 21, 2004

(51) Int. Cl.[7] .............................................. A01C 7/00
(52) U.S. Cl. ..................... 111/200; 111/900; 111/903; 111/921; 111/922; 701/50
(58) Field of Search ................ 111/200, 900, 111/903, 904, 921, 922; 172/1–3, 8–10; 701/50

(56) References Cited

U.S. PATENT DOCUMENTS

| | | | | |
|---|---|---|---|---|
| 5,913,915 A | * | 6/1999 | McQuinn .................... 701/50 |
| 6,009,354 A | * | 12/1999 | Flamme et al. ............. 700/184 |
| 6,070,539 A | * | 6/2000 | Flamme et al. ............. 111/177 |
| 6,145,455 A | * | 11/2000 | Gust et al. .................. 111/178 |
| 6,661,514 B1 | * | 12/2003 | Tevs et al. .................. 356/337 |

* cited by examiner

*Primary Examiner*—Christopher J. Novosad
(74) *Attorney, Agent, or Firm*—Rebecca Henkel; Brant T. Maurer (57) ABSTRACT

A drive mechanism for an agricultural planter includes a first electronic controller, a second electronic controller, a hydraulic valve manifold, hydraulic drives for the seed and fertilizer hoppers, and a feedback sensor from the hydraulic drives to the second electronic controller. The first electronic controller is located in the cab of the tractor connected to the planter, while the second electronic controller is mounted on the planter to control the operation of the hydraulic drives. The feedback sensors provide data as to the operation of the hydraulic drives. Another sensor associated with the forward speed of the planter also provides input to the second electronic controller so that the second controller can coordinate the operational speed of the hydraulic drives to provide the rate of application of the seed and fertilizer products desired by the operator. Changes in the rate of application of either the seed or fertilizer materials can be accomplished through input to the first electronic controller.

22 Claims, 7 Drawing Sheets

DRIVE MECHANISM FOR AGRICULTURAL PLANTERS

BACKGROUND OF THE INVENTION

This invention relates generally to improved apparatus for the delivery of particulate material, including seed and fertilizer, to the ground, and, more particularly, to the use of an automated delivery apparatus that delivers precise quantities of particulate material as a function of the speed at which the planter is operated and the parameters established for such delivery.

In conventional agricultural planters, seed and fertilizer products are distributed from separate hoppers through a metering device for delivery through a tube to fall by gravity to the ground and into a furrow formed therein for receipt of the seed and fertilizer. Seed particles are engaged by a singulator that operates to singulate the seeds so that the seeds can be dropped at a prescribed or desired rate through the delivery tube to the furrow. The quantities of the particulate fertilizer and seed material are to be monitored and delivered to the ground in a prescribed manner, including a certain spacing for the seeds within the furrow.

The systems for measuring the quantities of seed and fertilizer are conventionally based on elements driven by the tractor to which the agricultural planter is mounted or connected. One conventional system uses rotational power to drive a turbine to create a vacuum that will trap seeds on a perforated disk that is rotated through a mechanical apparatus, including gear reductions, so that the speed of rotation of the perforated disk is coordinated with the forward speed of movement of the tractor. This type of apparatus does not provide an adequate control of the dispensing of the seeds and fertilizer as a change in speed of operation of the tractor, thus affecting the forward speed of operation of the planter, the drive for the seeds and fertilizer does not change, resulting in a greater or lesser than desired seed spacing or spaces with no seeds planted at all. When the tractor comes to a stop, the inertia of the mechanism keeps the delivery system working for a period of time, thus producing a substantial loss of both seeds and fertilizer. The loss of seeds and fertilizer increases the cost of production and decreases productivity with respect to the different agricultural crops to be planted with the planter.

Other types of planters are mechanically driven through a ground drive mechanism that typically includes a chain drive mechanism connected to a drive wheel that defines the rate of speed of forward motion of the planter. This mechanical drive mechanism is geared to specific application rates for the seed and fertilizer, which is then controlled by the ground drive mechanism. To change the application rate of either the seed or the fertilizer, the size of the sprockets must be changed, requiring the planter to be halted and modified in order to make these changes.

It would be desirable to provide a planter drive mechanism that can be easily and conveniently changed to vary the rate of application of either the seed or the fertilizer to the ground. Such a drive mechanism would preferably be operable to halt the operation of the delivery apparatus whenever the planter is raised from the ground, whether into a headlands position or into a transport position. Such a drive mechanism would also preferably be operable to coordinate the rate of delivery of both the seed and fertilizer materials to the ground with respect to the speed of operation of the planter.

SUMMARY OF THE INVENTION

It is an object of this invention to provide a drive mechanism for an agricultural planter that resolves the aforementioned disadvantages of the prior art.

It is another object of this invention to provide a planter drive mechanism that both coordinates the delivery of both seed and fertilizer materials to the operating speed of the planter and provides a convenient manner in which to change the rate of application of either the seed or fertilizer materials.

It is a feature of this invention that the dispensing of both seed and fertilizer to the ground is accomplished through a hydraulic drive mechanism.

It is an advantage of this invention that the rate of application of either seed or fertilizer can be changed electronically without manually changing any mechanical devices.

It is still another object of this invention to provide a drive mechanism for an agricultural planter that has a first electronic controller for varying the application parameters for the seed and fertilizer materials and a second electronic controller for controlling the operation of the hydraulic drives to the seed and fertilizer hoppers.

It is another feature of this invention that the drive devices for both the seed and fertilizer materials include a feedback sensor in the form of an encoder to provide the second controller with information as to the rate of delivery of the respective materials to the ground.

It is another advantage of this invention that the second controller is operable to change the hydraulic drives for the delivery systems for the seed and fertilizer materials to provide a variable rate of operation of the delivery systems in coordination with the forward speed of operation of the planter.

It is still another feature of this invention that the planter is provided with a ground-engaging monitoring wheel having a sensor associated therewith to provide input to the second electronic controller as to the forward speed of operation of the agricultural planter.

It is still another advantage of this invention that the second electronic controller quickly changes the drive rate of the seed and fertilizer delivery systems in response to changes in the forward speed of the planter.

It is yet another advantage of this invention that the rate of application of the seed and fertilizer materials can be changed instantaneously by varying the input at the first electronic controller which in turn provides different parameters to the second electronic controller.

It is a further advantage of this invention that the rate of application of seed and fertilizer materials can be changed from the tractor cab without changing any mechanical drive devices on the planter.

It is a further object of this invention to provide a disc mower conditioner incorporating a modular disc cutterbar which is durable in construction, inexpensive of manufacture, carefree of maintenance, facile in assemblage, and simple and effective in use.

These and other objects, features and advantages are accomplished according to the instant invention by providing a drive mechanism for an agricultural planter which includes a first electronic controller, a second electronic controller, a hydraulic valve manifold, hydraulic drives for the seed and fertilizer hoppers, and a feedback sensor from the hydraulic drives to the second electronic controller. The first electronic controller is located in the cab of the tractor connected to the planter, while the second electronic controller is mounted on the planter to control the operation of the hydraulic drives. The feedback sensors provide data as to the operation of the hydraulic drives. Another sensor associated with the forward speed of the planter also provides input to the second electronic controller so that the second controller can coordinate the operational speed of the hydraulic drives to provide the rate of application of the seed and fertilizer products desired by the operator. Changes in the rate of application of either the seed or fertilizer materials can be accomplished through input to the first electronic controller.

DETAILED DESCRIPTION OF THE PREFERRED EMBODIMENTS

Figure 1:
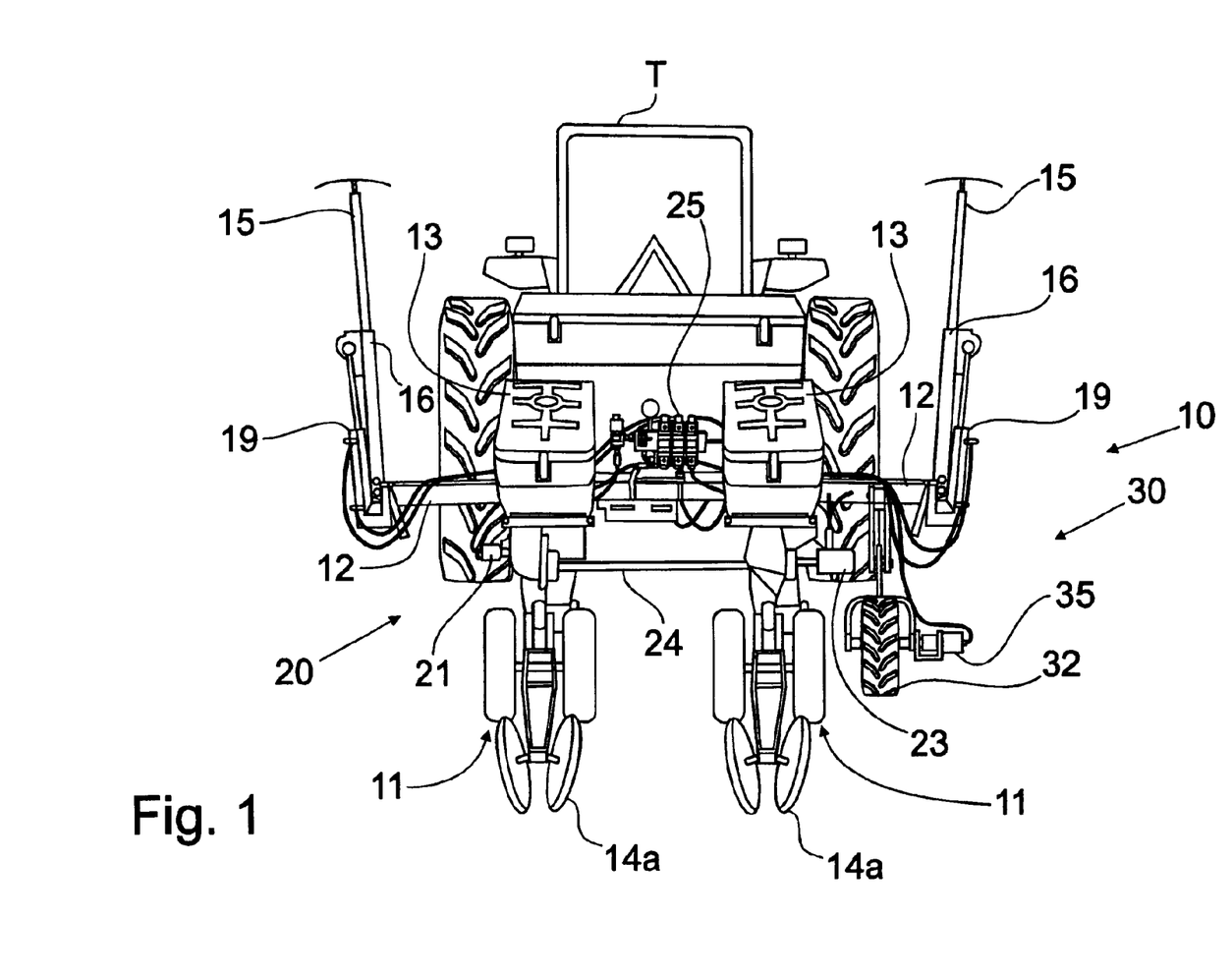
FIG. 1 is an elevational view of a planter incorporating the principles of the instant invention connected to the rear of a tractor providing operational power.

Referring first to FIG. 1, an overall view of the agricultural planter incorporating the principles of the instant invention can best be seen. Any left and right references are used as a matter of convenience and are determined by standing at the rear of the planter 10 facing the forward direction of travel which is the direction in which FIG. 1 is oriented. The planter 10 is mounted to the rear of a tractor T that provides motive and operational power for the planter 10. One skilled in the art will recognize that the planter 10 shown in FIG. 1 is a two row planter, but that the principles of the instant invention are applicable to much larger planters 10, including those planters operable to plant 20 or more rows. The planter 10 is provided with a pair of opposing field markers 15 pivotally mounted on the transverse frame 12 of the planter 10. The field markers 15 are generally conventional in construction and are formed of an arm 16 that is movable between a raised transport or non-operating position, as depicted in FIG. 1, to a lowered operative position in which the rotatable disk 17 mounted on the end of the arm 16 is engaged with the ground to form a mark therein to enable the operator to follow on the return path to maintain the rows of crop being planted in parallel configuration. The pivotal movement of the field marker arms 16 is powered by a hydraulic cylinder 19 anchored to the frame 12 and operable to effect the pivotal movement of the arm 16 in a generally known manner.

The planter 10 includes a hopper apparatus 13 supported on the frame 12 preferably in a one-to-one relationship with respect to the number of row units 11 provided on the planter 11 to plant rows of crop in one pass of the planter 10. The hopper apparatus 13 includes a compartment or individual hopper for each of seed particles and fertilizer to be deposited into the ground in a conventional manner. Each compartment or hopper is associated with a conventional product delivery system (not shown) that effects the delivery of the seed or fertilizer particles to the ground in a desired manner and in at a desired rate of delivery. The instant invention relates to a drive mechanism for the product delivery systems to control the rate and application of the product to the ground. As is depicted in FIG. 1, the planter 10 is also provided with conventional openers 14 and closers 14a that are operable in a known manner to create a furrow in the surface of the ground into which the seed and fertilizer particles are appropriately positioned before moving soil over top of the seed and fertilizer to close the furrow and complete the planting process.

The planter 10 is provided with a hydraulic drive mechanism 20 associated with both the seed and fertilizer product delivery systems to control the rate of delivery of the respective product to the ground. The hydraulic drive mechanism 20 includes a first hydraulically driven motor 21 coupled to the seed delivery system 42 and a second hydraulically driven motor 23 operatively coupled to the fertilizer delivery system 44. Preferably, the hydraulic motor 23 is connected through a drive shaft 24 that interconnects each of the corresponding fertilizer delivery systems across the row units 11, or at least with groups of row units 11, to maximize power and economic constraints associated with the particular size of the planter being manufactured. Similarly, the hydraulic motor 21 would be coupled to all of the seed delivery systems of the respective hoppers 13 through a shaft (not shown). By coupling all of the like product delivery systems to the same drive motor 21, 23, a consistency in product delivery from all of the hoppers 13 will be accomplished because all of the like manufactured product delivery systems will be operated at the same speed of operation.

Figure 3:
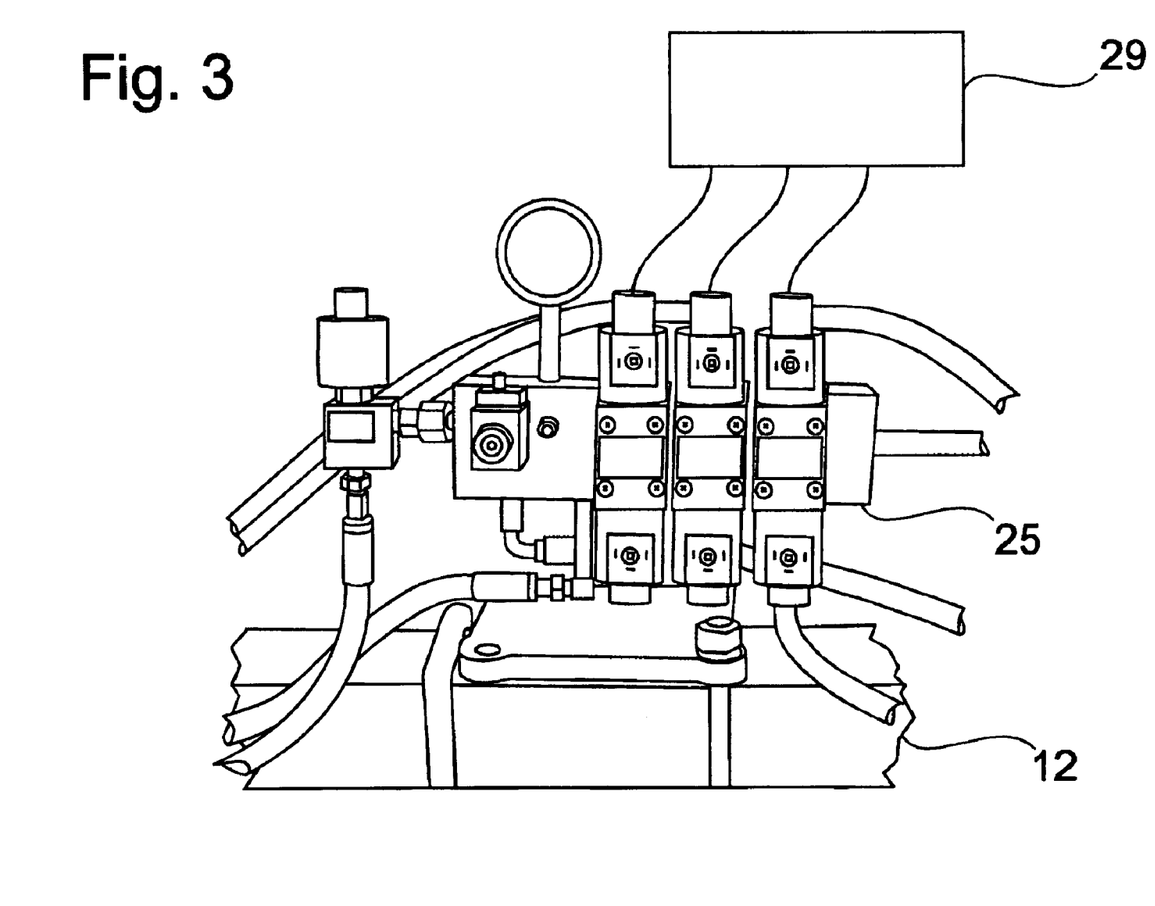
FIG. 3 is an elevational view of the hydraulic valve manifold controlled by the second electronic controller.

The hydraulic motors 21, 23 are powered by the hydraulic system carried by the tractor T through a hydraulic manifold 25 supported on the planter frame 12 as depicted in FIGS. 1 and 3. The hydraulic manifold 25 not only delivers the flow of hydraulic fluid to the motors 21, 23 at a prescribed rate as described in greater detail below, but also controls the flow of hydraulic fluid to the field marker hydraulic cylinders 19. The hydraulic manifold 25 is operatively connected to an electronic controller or microprocessor for the planter 29 that automatically controls the rate of flow of hydraulic fluid to the respective hydraulic devices 19, 21, 23 to accomplish the desired planting activity, as will be described in greater detail below.

Figure 2:
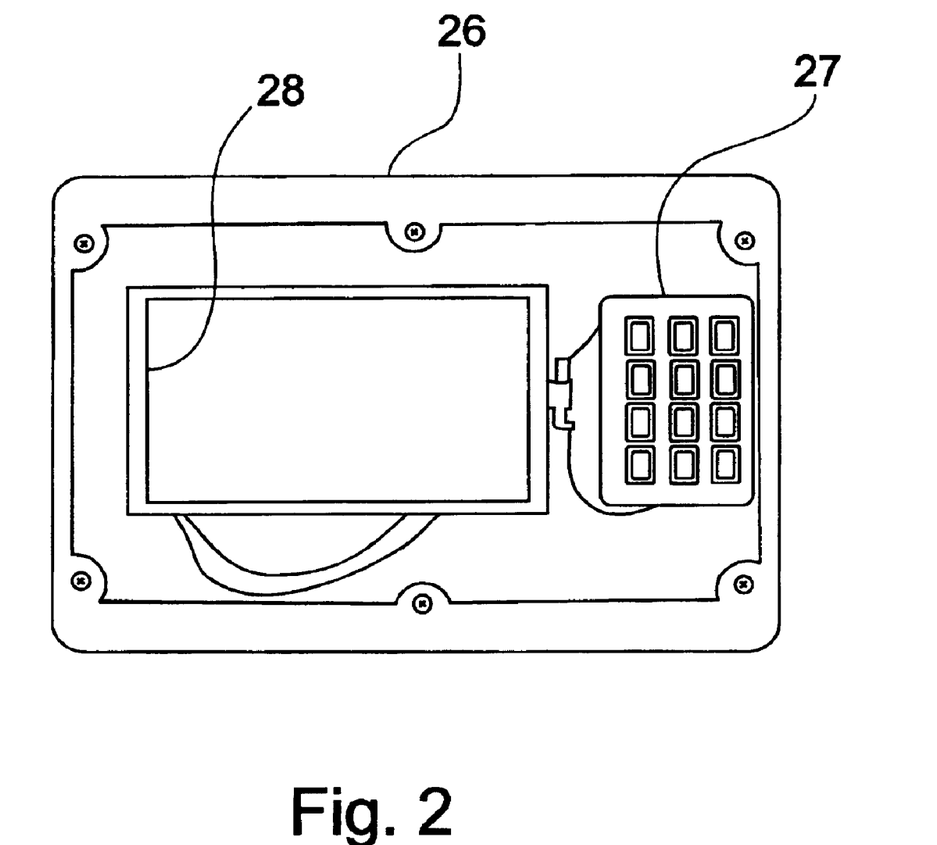
FIG. 2 is a plan view of the first electronic controller for inputting the application parameters for control of the operation of the planter.
Figure 6:
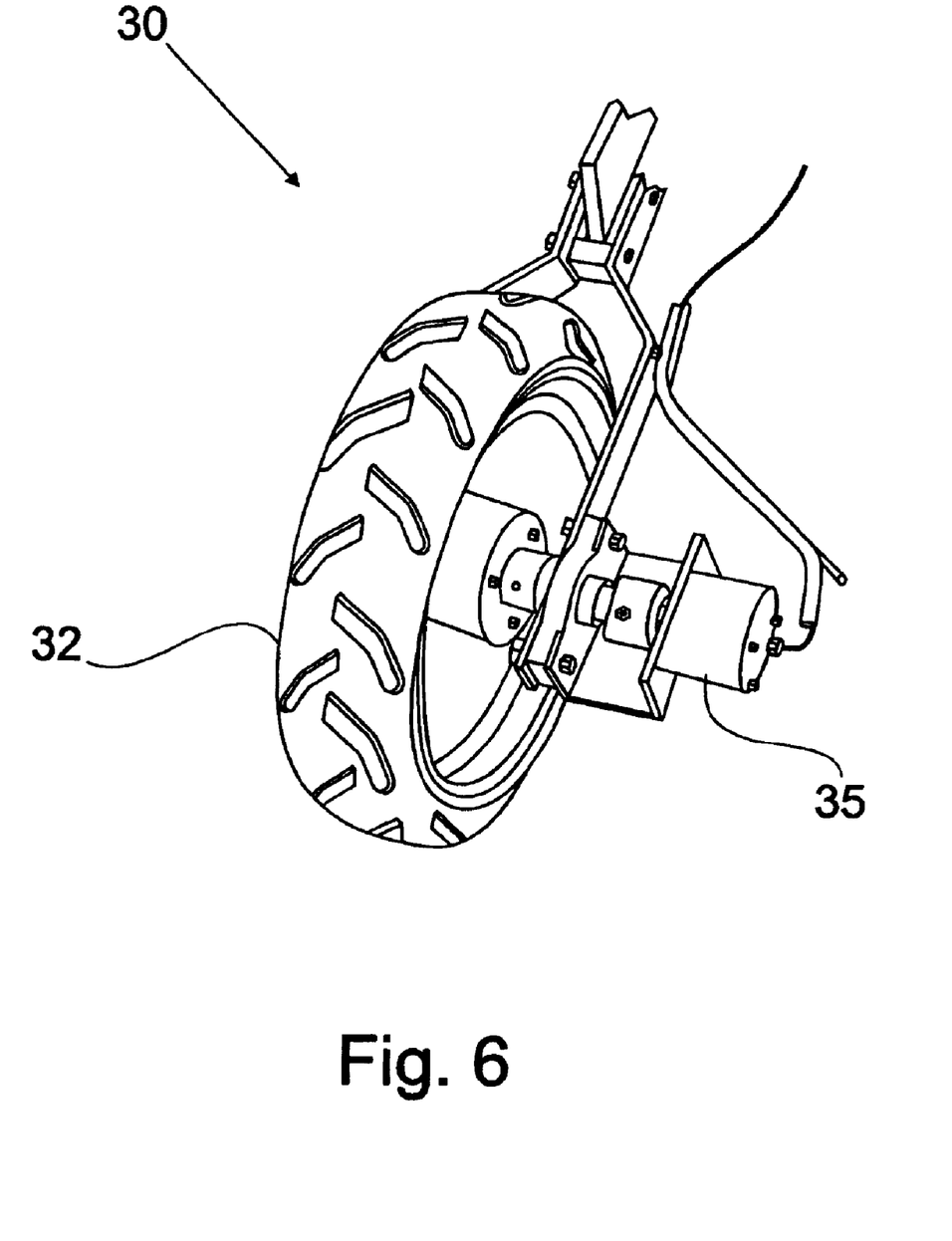
FIG. 6 is an enlarged perspective view of the speed indicator monitoring wheel mounted to the planter and the feedback sensor associated therewith.

As best seen in FIGS. 1 and 6, the planter 10 is also provided with a speed indicator 30 in the form of a ground engaging wheel 32 depending from the frame 12. An electronic speed sensor 35 is coupled to the wheel 32 to sense the rate of rotation of the wheel 32 and then send a signal indicative of the rotation rate to the electronic planter controller 29. By knowing the diameter of the wheel 32 and the sensed rate of rotation thereof, the controller 29 can calculate the speed at which the planter 10 is traveling along the surface of the ground instantaneously. An input controller 26, preferably located at the operator's station of the tractor T as shown in FIG. 2, is used to input the desired rate of application of seed and/or fertilizer to the ground through a conventional numeric keypad 27 in response to queries from appropriate software displayed on the monitor 28. Input for the input controller 26 could be in the form of desired plant population, i.e. the spacing requirements of the seed vis-á-vis the row spacing of the planter 10, or in the form of weight of product for a given area of ground, which is typically used for fertilizer. The planter controller is operable to drive the hydraulic motors 21, 23 at a rate that delivers both seed and fertilizer to the ground according to the desired population rates in response to the speed of operation of the planter 10 as sensed from the speed indicator 30.

Figure 4:
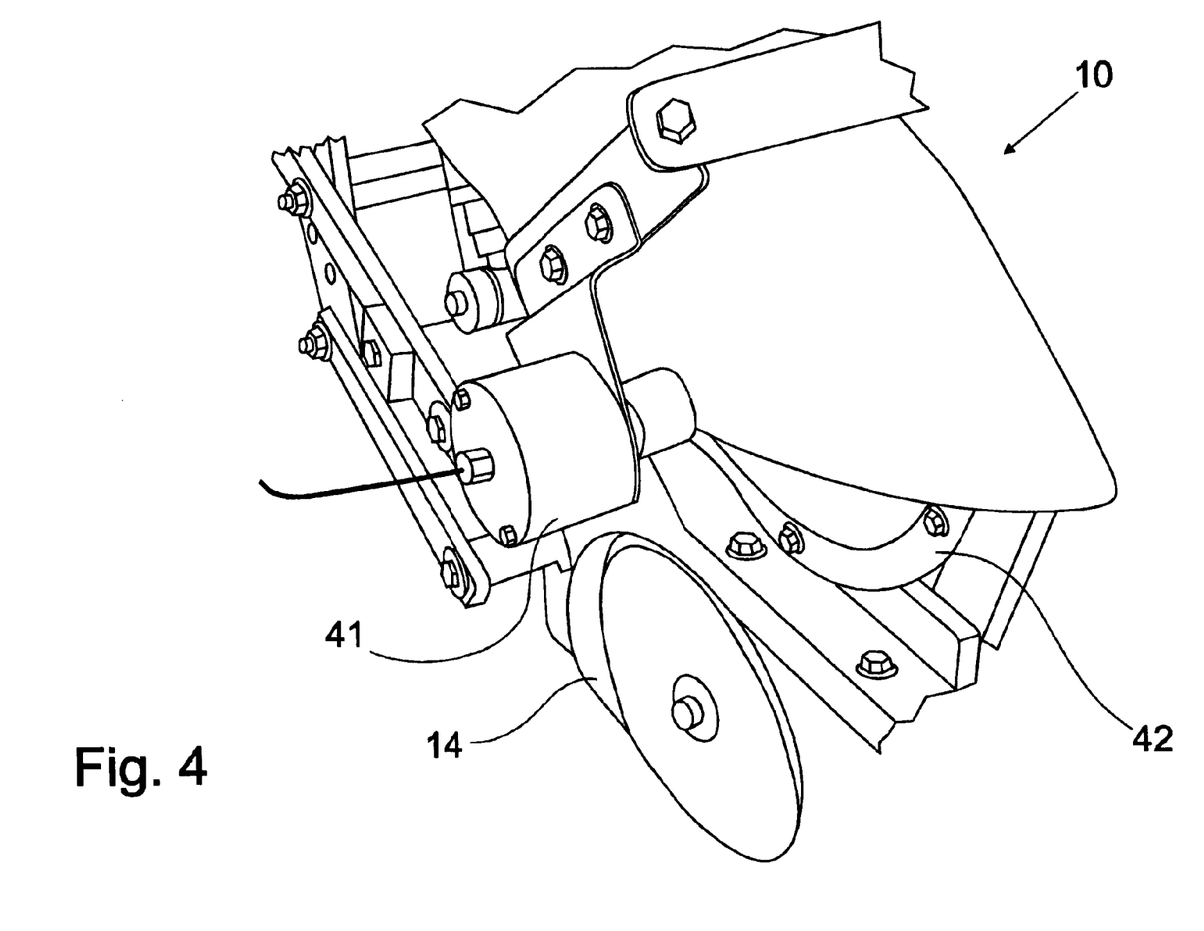
FIG. 4 is an enlarged detail view of the feedback sensor for the hydraulic drive of the seed delivery system.
Figure 5:
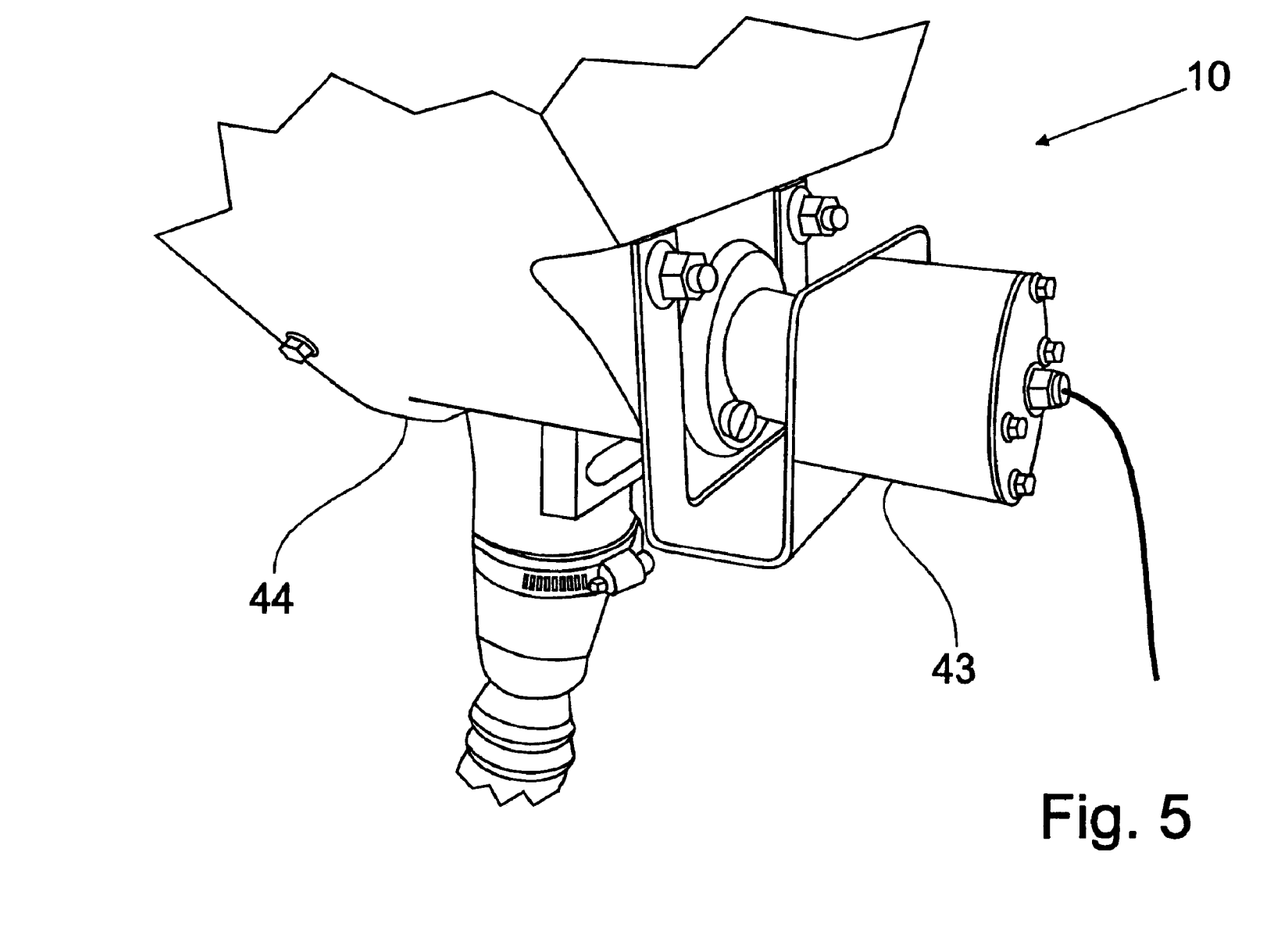
FIG. 5 is an enlarged detail view of the feedback sensor for the hydraulic drive of the fertilizer delivery system.
Figure 7:
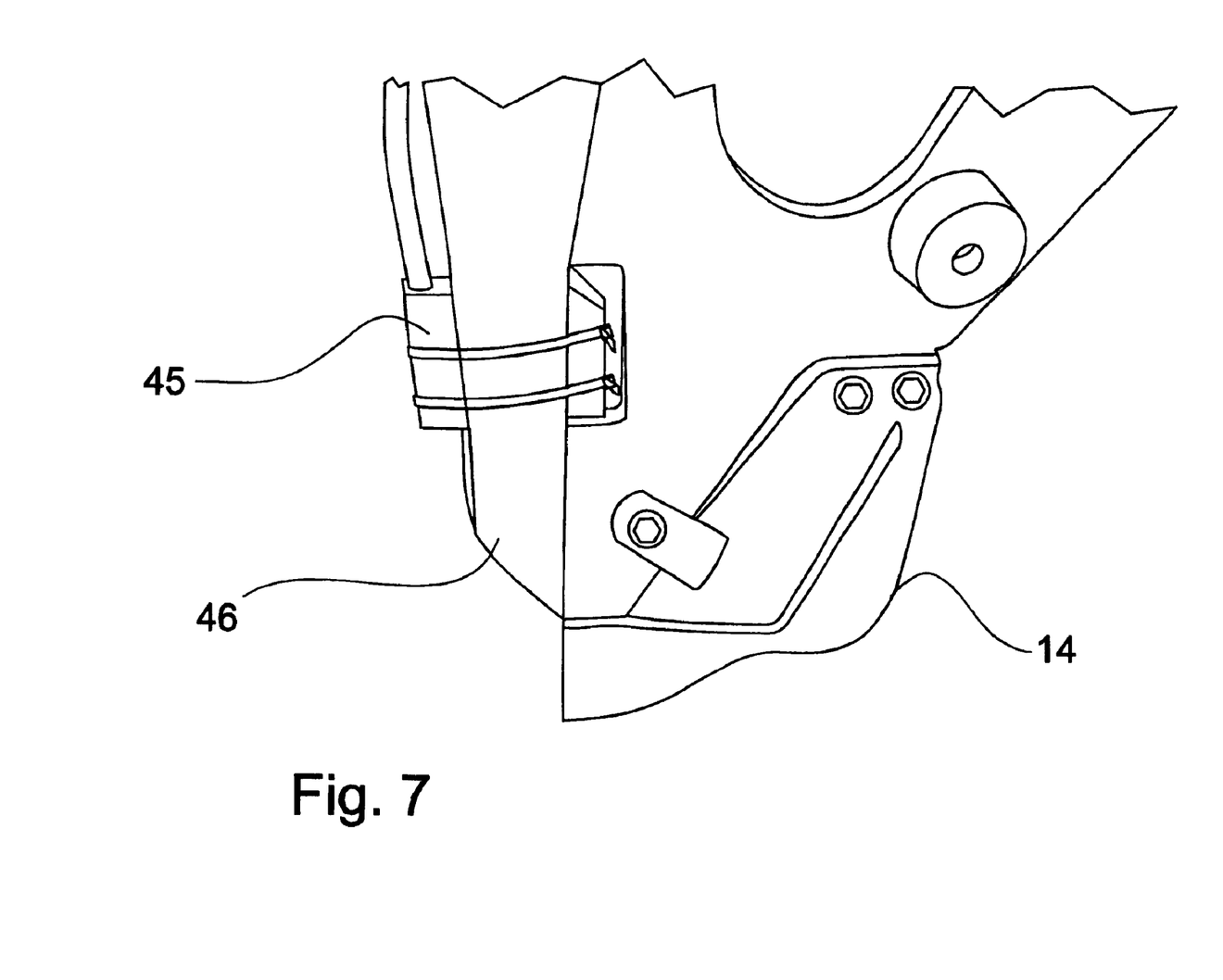
FIG. 7 is a side elevational view of the seed delivery tube and the optical sensor associated therewith.

As is best seen in FIGS. 4 and 5, the planter 10 is also provided with feed back sensors 41, 43 associated with the seed delivery system 42 and the fertilizer delivery system 44, respectively, to determine if the actual rate of delivery of the seed and fertilizer is progressing as is defined by the planter controller 29. If the planter 10 is mis-adjusted or has worn parts that do not perform as intended, the feedback sensors 41, 43 will alert the planter controller 29, which will make appropriate adjustments to the hydraulic motors 21, 23 to provide the population rates for the seed and fertilizer that are inputted from the input controller 26. Furthermore, as is depicted in FIG. 7, the planter 10 is also preferably equipped with an optical sensor 45 associated with the seed delivery tube 46 to provide a final feedback to the planter controller 29 that the produce is actually being delivered to the ground. Should a plug of some sort occur between the product delivery systems and the delivery tubes directing the product to the ground, the optical sensor 45 will signal the planter controller 29 that product is no longer being dispensed, whereupon the planter controller 29 will signal the operator in the tractor T through the input controller 26.

In operation, the operator sets the desire plant population, e.g. plant spacing, and fertilizer application rates into the input controller 26 which then communicates with the planter controller 29. The planter controller 29 is operable to control the rate of rotation of the hydraulic motors 21, 23 that are driving the product delivery systems for seed and fertilizer, respectively, through the hydraulic manifold 25. Through the speed indicator 30, the planter controller 29 has an instantaneous input of the speed of movement of the planter 10 over the ground and adjusts the rotation rate of the hydraulic motors 21, 23 to provide the desired application of both seeds and fertilizer to the ground. The feedback sensors 41, 43 provide further input to the planter controller 29 to define the actual application rate of the seed and fertilizer products and enables the planter controller 29 to make appropriate adjustments to accurately deliver the desired rates of both seed and fertilizer to the ground.

One skilled in the art will recognize that this planter drive mechanism 20 is easily adaptable to delivering application rates of either or both of seed and fertilizer as defined by a mapping system stored in the input controller 26. For example, a map of the soil productivity, by soil type or other appropriate parameter, could be loaded into the input controller 26 with each zone on the map being associated with a different application rate of seed and/or fertilizer. A GPS system which would locate the position of the planter 10 in the field in relation to the map stored in the controller 29, would enable the input controller 26 to provide an instantaneous adjustment of the application rates of seed and/or fertilizer through the planter controller 29 as the planter 10 passes from one mapped zone to another.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

For example, the two controllers 26, 29 could be formed as a single controller providing both functions of inputting data and controlling the hydraulic manifold 25. Other possible changes within the scope of the invention would include a hydraulic motor on each of the individual product delivery systems; however, the controller 29 would preferably then need to be able to control the rotational rate of each respective motor individually so as to provide an accurate delivery of seed and fertilizer as desired for each row. One skilled in the art will also recognize that other forms of speed indicators and feedback sensors are within the scope of the instant invention. In the way of example, a conventional radar unit (not shown) could be supplied in place of the above-described speed indicator 30 to provide a signal to said planter controller 29 as to the actual rate of travel of the planter 10 over the surface of the ground.

Having thus described the invention, what is claimed is:

1. A drive mechanism for an agricultural planter having a frame adapted for movement across the ground at a desired rate of travel, individual row units supported on the frame and being provided with a hopper apparatus having containers for holding a supply of product to be distributed to the ground, a product supply apparatus associated with each said container for delivering the product to the ground in a desired manner, comprising:

a hydraulic motor coupled with the product supply apparatus for each respective kind of product to drive the operation of said product supply apparatus such that the rate of application of the respective products to the ground can be selectively varied; and a controller operatively associated with said hydraulic motors to control the rate of rotation of said hydraulic motors, and thereby control the rate of application of the corresponding said product to the ground, in response to a parameter inputted into said controller representative of the desired rate of application of said product and in response to a signal from a speed sensor indicating the actual rate of travel of said planter over the ground, wherein the controller operatively regulates a manifold controlling a flow of hydraulic fluid to said hydraulic motors, the manifold also controlling a flow of hydraulic fluid to move a field marker to mark the ground.

2. The drive mechanism of claim 1 wherein said hydraulic motor for each respective said kind of product is operatively coupled to each product supply apparatus corresponding to the container for the corresponding kind of said product at each row unit in order to drive all like product supply apparatuses at the same rate of application.

3. The drive mechanism of claim 2 wherein each said hydraulic motor is coupled to said corresponding product supply apparatuses by a drive shaft.

4. The drive mechanism of claim 1 wherein said controller includes an input controller element for inputting the desired rate of application of each said product, and a planter controller element for operatively controlling the hydraulic manifold supplying hydraulic fluid to said hydraulic motors.

5. The drive mechanism of claim 4 wherein said planter further includes a speed indicator supported from said frame to provide a signal to said planter controller element indicative of the actual rate of speed of said planter over the ground.

6. The drive mechanism of claim 5 wherein said speed indicator comprises:

a wheel depending downwardly from said frame for rotation upon movement across the surface of the ground; and a speed sensor connected to said wheel to sense the rate of rotation of said wheel and provide a signal to said planter controller element indicative of said rate of rotation.

7. The drive mechanism of claim 4 wherein planter further comprises:
a feedback sensor associated with each said product supply apparatus to provide a signal to said planter controller element indicative of the actual rate of application of the corresponding said product to the ground.

8. The drive mechanism of claim 7 wherein said planter controller element is operable to change the rate of rotation of said hydraulic motors as required to adjust the actual rate of application of said product to the ground to match the desired rate of application inputted into said input controller element.

9. The drive mechanism of claim 7 wherein said planter further comprises a sensor to detect the actual distribution of each respective said product to the ground.

10. The drive mechanism of claim 4 wherein said input controller element has stored therein a map dividing the surface of the ground into respective zones as a function of a selected productivity parameter, said input controller element being operable with a position tracking mechanism to provide a change signal to said planter controller element that changes the desired rate of application of the respective said products as a function of the map zone in which said planter is located.

11. An agricultural planter comprising:
a frame adapted for movement over the surface of the ground at a rate of speed;
individual row units supported on the frame and being provided with a hopper apparatus having seed and fertilizer containers for holding separate supplies of seed and fertilizer to be distributed to the ground;
a product supply apparatus associated with each said container for delivering the seed and fertilizer to the ground at a rate of application;
a first hydraulic motor coupled with the product supply apparatus for each respective said seed container to drive the operation of said product supply apparatus such that the rate of application of seed to the ground can be selectively varied;
a second hydraulic motor coupled with the product supply apparatus for each respective said fertilizer container to drive the operation of said product supply apparatus such that the rate of application of fertilizer to the ground can be selectively varied independently of said rate of application of seed to the ground;
a speed sensor for providing a speed signal indicative of the rate of speed of said planter of the surface of the ground; and
a controller operatively associated with said first and second hydraulic motors to control the rate of rotation thereof, and thereby control the respective rates of application of seed and fertilizer to the ground, in response to a parameter inputted into said controller representative of the desired rate of application of each of said seed and fertilizer and in response to said speed signal,
wherein the controller operatively regulates a manifold controlling a flow of hydraulic fluid to said hydraulic motors, the manifold also controlling a flow of hydraulic fluid to move a field marker to mark the ground.

12. The planter of claim 11 wherein said first hydraulic motor is operatively coupled to each product supply apparatus corresponding to the seed containers in order to drive all the product supply apparatuses for the seed containers at the same rate of application.

13. The planter of claim 12 wherein said second hydraulic motor is operatively coupled to each product supply apparatus corresponding to the fertilizer containers by a drive shaft to drive the operation of all the product supply apparatuses for the fertilizer containers at the same rate of application.

14. The planter of claim 13 wherein said controller includes an input controller element for inputting thee desired rate of application of each said product, and a planter controller element for operatively controlling the hydraulic manifold supplying hydraulic fluid to said hydraulic motors.

15. The planter of claim 14 wherein planter further comprises:
a feedback sensor associated with each said product supply apparatus to provide a signal to said planter controller element indicative of the actual rate of application of said seed and fertilizer, respectively, to the ground.

16. The planter of claim 15 wherein said planter controller element is operable to change the rate of rotation of said first and second hydraulic motors, respectively, to adjust the actual rate of application of said seed and fertilizer to the gourd to match the desired rate of application inputted into said input controller element.

17. The planter of claim 16 wherein said input controller element has stored therein a map dividing the surface of the ground into respective zones as a function of a selected productivity parameter, said input controller element being cooperable with a position tracking mechanism to provide a change signal to said planter controller element that changes the desired rate of application of the respective said products as a function of the map zone in which said planter is located.

18. A method of controlling the rate of planting a product in the ground with an agricultural planter having a frame adapted for movement across the ground at a desired rate of travel, individual row units supported on the frame and being provided with a hopper apparatus having containers for holding a supply of said product to be distributed to the ground, a product supply apparatus associated with each said container for delivering the product to the ground in a desired manner, comprising the steps of:
providing a selectively variable drive mechanism for each said product supply apparatus to provide a variable rate of application of said product to the ground;
inputting a desired rate of application of said product into a controller;
sensing the actual rate of travel of said planter over the ground and developing a speed signal representative of said actual rate of travel; and
changing the rate of application of said product by a controller in response to said desired rate of application of said product and said speed signal,
wherein the sensing step includes measuring a speed of a drop-down wheel mounted at the frame of the planter and generating an electrical signal representative of the actual rate of travel of the drop-down wheel.

19. The method of claim 18, further comprising the step of:
adjusting the rate of application of said product in response to a feedback signal from a feedback sensor associated with each said product supply apparatus representing the actual rate of application of said product to the ground.

20. The method of claim 19 wherein said step of changing the rate of application of said product includes the step of:

modifying the rate of flow of hydraulic fluid to a hydraulic motor forming part of said variable drive mechanism.

21. The method planter of claim 20 wherein said modifying step includes the step of:

manipulating a hydraulic manifold operatively connected to each said hydraulic motor by said controller to change the rate of flow of hydraulic fluid to each said hydraulic motor.

22. The method of claim 18 further comprising the steps of:

sensing the location of said planter in relation to a map stored in said controller representing zones dividing said map according to selected productivity parameters; and adjusting the rate of application of said product to the ground as a function of the productivity parameter in the zone in which said planter is located.

* * * * *